United States Patent
Nayse et al.

(10) Patent No.: US 11,677,511 B2
(45) Date of Patent: Jun. 13, 2023

(54) MECHANISM TO RECOVER RECEIVER RADIO LINK CONTROL AFTER MULTIPLE UNSUCCESSFUL AUTOMATIC REPEAT QUERY ATTEMPTS

(71) Applicant: QUALCOMM Incorporated, San Diego, CA (US)

(72) Inventors: Anushka Nayse, Zuarinagar (IN); Ankur Srivastava, Lucknow (IN); Rahul Maringanti, Hyderabad (IN); Mohammad Ashraf, Cuttack (IN); Vivek Bindal, Bharatpur (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/454,438

(22) Filed: Nov. 10, 2021

(65) Prior Publication Data
US 2023/0144413 A1    May 11, 2023

(51) Int. Cl.
| H04L 1/00 | (2006.01) |
| H04L 1/1829 | (2023.01) |
| H04L 1/1867 | (2023.01) |
| H04W 76/38 | (2018.01) |
| H04L 1/1607 | (2023.01) |

(52) U.S. Cl.
CPC .......... H04L 1/1851 (2013.01); H04L 1/1642 (2013.01); H04L 1/1883 (2013.01); H04W 76/38 (2018.02)

(58) Field of Classification Search
None
See application file for complete search history.

(56) References Cited

U.S. PATENT DOCUMENTS

| | | | |
|---|---|---|---|
| 2018/0083688 A1* | 3/2018 | Agiwal | H04W 48/16 |
| 2020/0092939 A1* | 3/2020 | Kim | H04W 76/30 |
| 2020/0221329 A1* | 7/2020 | Kim | H04W 28/065 |
| 2020/0235869 A1* | 7/2020 | Pradas | H04L 1/1896 |
| 2021/0136829 A1* | 5/2021 | Kim | H04W 36/18 |
| 2021/0153086 A1* | 5/2021 | Kim | H04W 36/02 |

FOREIGN PATENT DOCUMENTS

| | | |
|---|---|---|
| CN | 104593743 A | 5/2015 |
| EP | 2157589 A1 | 2/2010 |
| JP | 08225940 A | 9/1996 |
| KR | 100813572 B1 | 3/2008 |
| KR | 20090120034 A1 | 11/2009 |

OTHER PUBLICATIONS

International Searh Report/ Written Opinion issued to PCT/US2021/046122 dated Nov. 30, 2021.

* cited by examiner

*Primary Examiner* — Mujtaba M Chaudry
(74) *Attorney, Agent, or Firm* — Patterson+ Sheridan, L.L.P.

(57) ABSTRACT

Certain aspects of the present disclosure provide techniques for A method for wireless communication by a user equipment (UE), comprising initiating a timer upon reception of a first segmented packet of a plurality of packets of an RLC physical data unit (PDU) at radio link control (RLC) layer, resetting the timer when a packet data convergence protocol (PDCP) layer receives an RLC PDU from the RLC layer, and upon expiry of the timer, initiating a radio recourse control (RRC) connection reestablishment (RRE) procedure with a network.

30 Claims, 8 Drawing Sheets

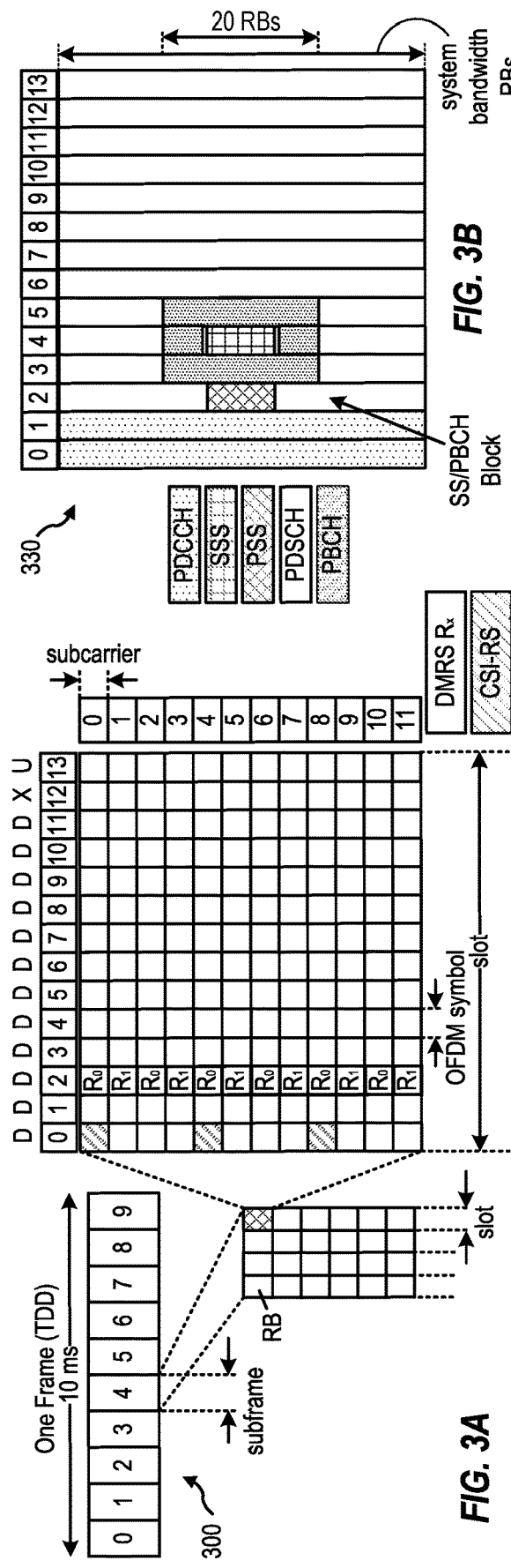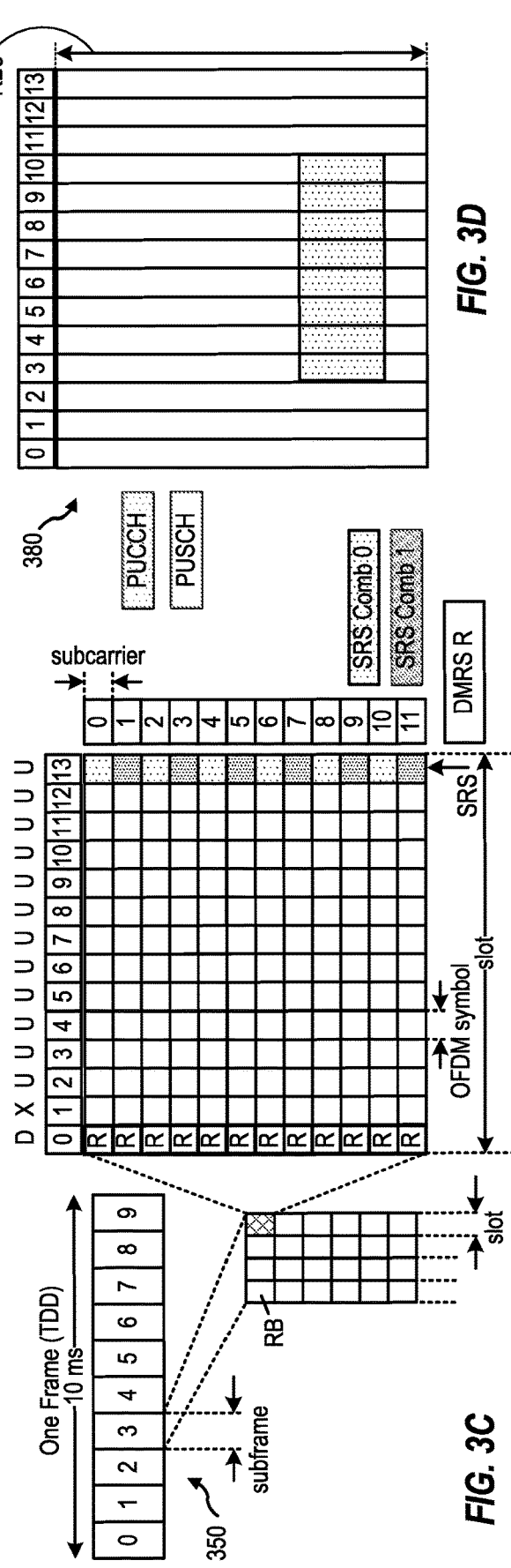

700

A METHOD FOR WIRELESS COMMUNICATION BY A USER EQUIPMENT (UE)

710

INITIATING A TIMER UPON RECEPTION OF A FIRST SEGMENTED PACKET OF A PLURALITY OF PACKETS OF AN RLC PHYSICAL DATA UNIT (PDU) AT RADIO LINK CONTROL (RLC) LAYER

720

RESETTING THE TIMER WHEN A PACKET DATA CONVERGENCE PROTOCOL (PDCP) LAYER RECEIVES AN RLC PDU FROM THE RLC LAYER

730

UPON EXPIRY OF THE TIMER, INITIATING A RADIO RECOURSE CONTROL (RRC) CONNECTION REESTABLISHMENT (RRE) PROCEDURE WITH A NETWORK

FIG. 7

MECHANISM TO RECOVER RECEIVER RADIO LINK CONTROL AFTER MULTIPLE UNSUCCESSFUL AUTOMATIC REPEAT QUERY ATTEMPTS

INTRODUCTION

Aspects of the present disclosure relate to wireless communications, and more particularly, to techniques for recovering receiver radio link control (RLC) using a radio resource control (RRC) reconnection establishment (RRE) procedure after multiple failed automatic repeat query (ARQ) attempts.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE). The method may include initiating a timer upon reception of a first segmented packet of a plurality of packets of an RLC physical data unit (PDU) at radio link control (RLC) layer. The method may include resetting the timer when a packet data convergence protocol (PDCP) layer receives an RLC PDU from the RLC layer. The method may include, upon expiry of the timer, initiating a radio recourse control (RRC) connection reestablishment (RRE) procedure with a network.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 3A, FIG. 3B, FIG. 3C, and FIG. 3D depict various example aspects of data structures for a wireless communication network.

FIG. 7 is a flow diagram illustrating example operations for wireless communication by a UE, in accordance with certain aspects of the present disclosure.

DETAILED DESCRIPTION

Aspects of the present disclosure provide apparatuses, methods, processing systems, and computer-readable mediums for recovering receiver radio link control (RLC) using a radio resource control (RRC) reconnection establishment (RRE) procedure after multiple failed automatic repeat query (ARQ) attempts.

Where wireless communication is unstable, the user equipment (UE) may receive perforated data even when a base station (BS) transmits complete, in-sequence PDUs. Each segmented data unit, called a protocol data unit (PDU) segment, is tagged with a sequence number corresponding to a complete Radio Link Control (RLC) PDU. When a UE receives PDU segments, it stores them in a reassembly window. The segments are stored in the window until all segments for the corresponding PDU have arrive in the reassembly window. The UE may not forward PDUs to an upper layer of the UE until all segments for the PDU are received and reassembled. This also means that the UE may not forward incomplete PDUs to an upper layer of the UE until all segments for the PDU are received and reassembled.

When a UE does not receive every PDU segment from a BS, the UE may delay or suspend all packet delivery from an RLC layer to the upper layers of a UE, and try to recover any missing PDU segments. The UE may monitor incoming traffic from the network at the RLC layer. If the UE does not receive every PDU segment for a complete PDU within a given timeframe, the UE may generate an automatic repeat query (ARQ) request and send the ARQ request to the BS. In response to an ARQ request, a BS may retransmit missing packets to the UE. On occasion, a BS may fail to respond to numerous ARQ requests and PDU segments may be stuck in the reassembly window, halting data flow to upper layers of the UE.

According to certain aspects of the present disclosure, when a BS fails to respond to multiple ARQ requests meant to recover missing PDU segments, a UE may reestablish communication with a BS by implementing a Radio Resource Control (RRC) Connection Reestablishment (RRE) procedure. Utilizing a reset timer, a UE may recognize that PDU segments are stuck in the reassembly window at the RLC layer by monitoring the data flow of PDUs to upper layers of the UE. In response, the UE may transmit an RRE request to a BS, and BS may initiate a communication reset. As a result of reset, older, failed sequence numbers are not recovered after the reset. The communication may then flow as normally, where PDUs received at the RLC layer are sent to the PDCP for further processing at the PDCP.

This procedure is useful when ARQ requests fail to reestablish wireless connection between the UE and the BS. By implementing aspects of the present disclosure, a UE may reduce latency and more quickly reestablish data flow to upper layer of the UE.

Introduction to Wireless Communication Networks

Figure 1:
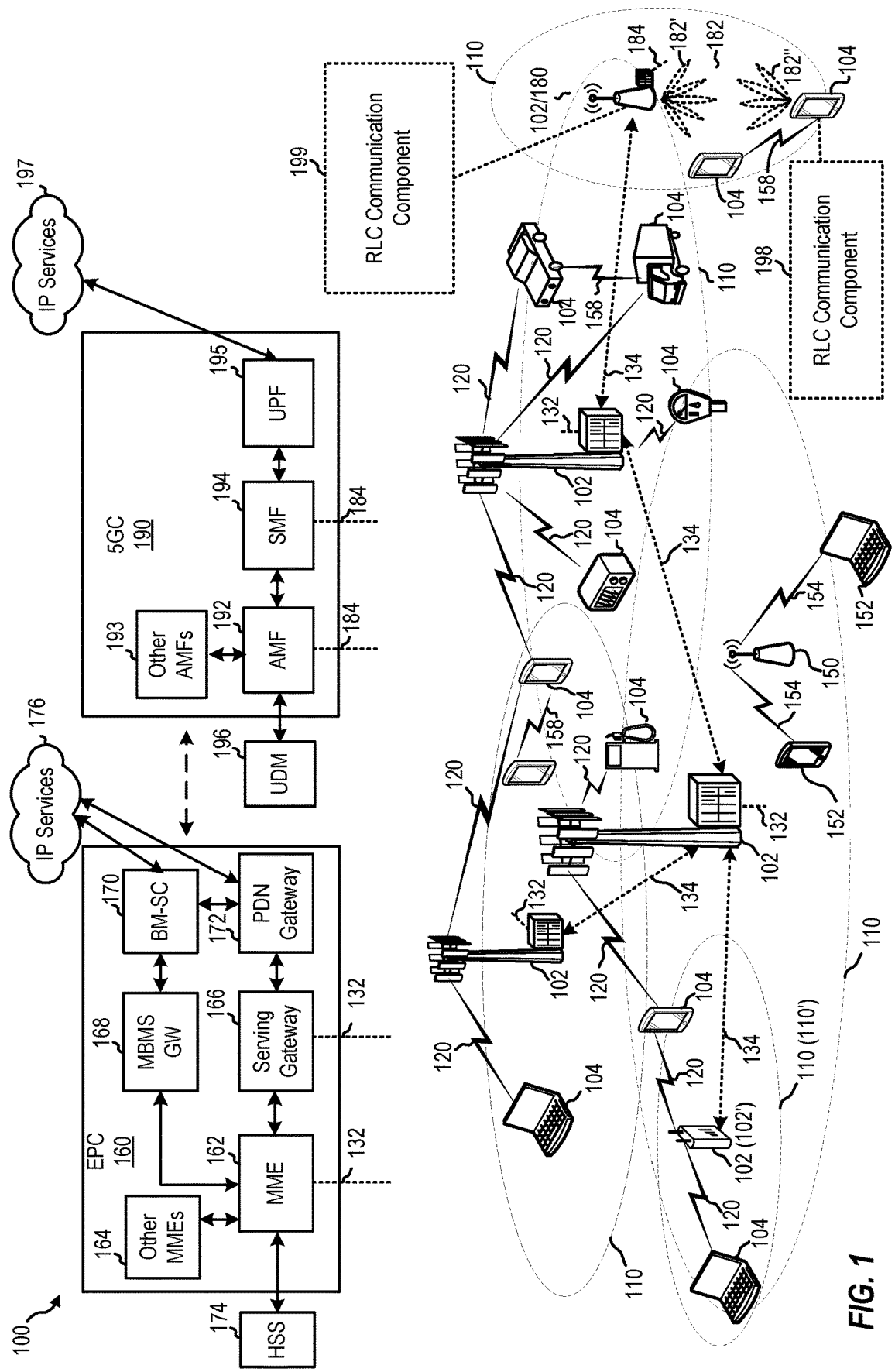
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes radio link control (RLC) communication component 199, which may be configured to transmit information to an RLC layer of a UE. Wireless network 100 further includes RLC communication component 198, which may be used configured to recieve information at an RLC layer from a network node, such as a BS.

Figure 2:
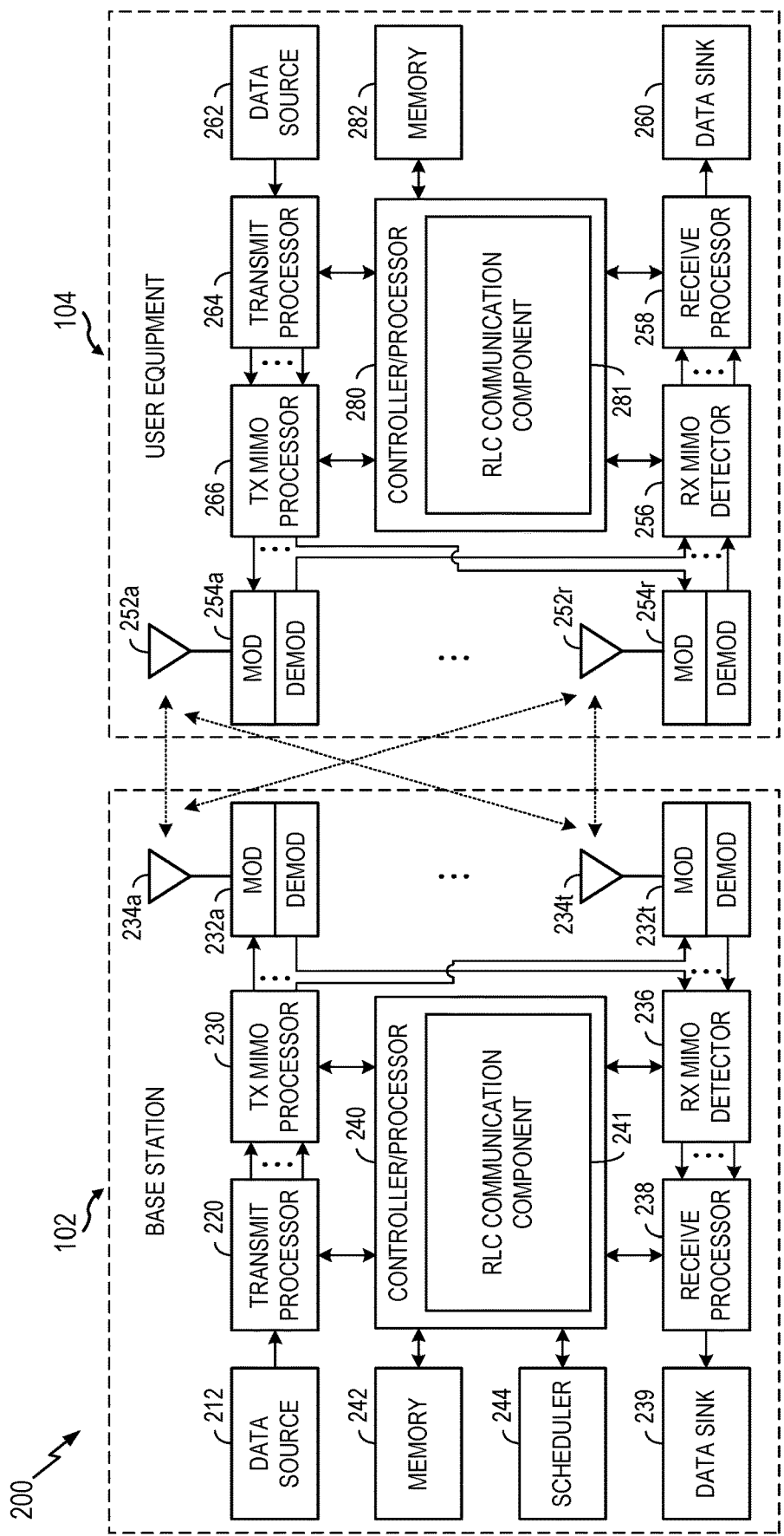
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes RLC communication component 241, which may be representative of RLC communication component 199 of FIG. 1. Notably, while depicted as an aspect of controller/processor 240, RLC communication component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes RLC communication component 281, which may be representative of RLC communication component 198 of FIG. 1. Notably, while depicted as an aspect of controller/processor 280, RLC communication component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Figure 4:
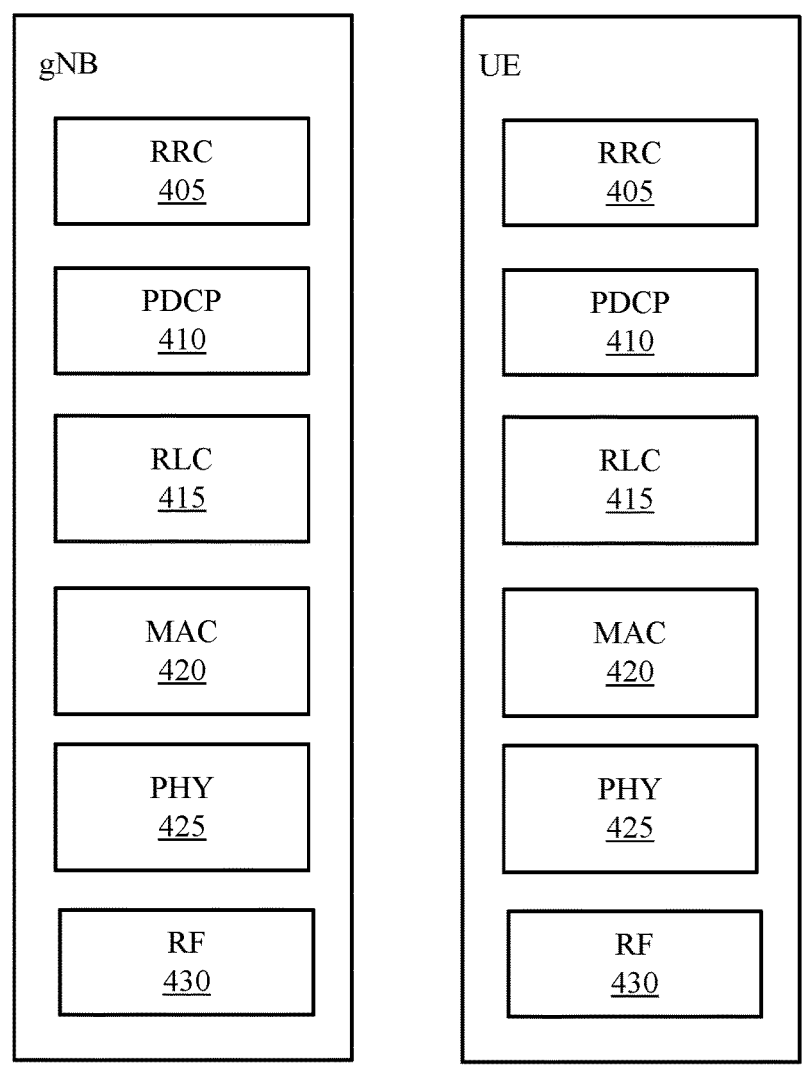
FIG. 4 depicts an example 5G protocol stack for a wireless entity and a user equipment (UE).

FIG. 4 illustrates a diagram showing examples for implementing a communications protocol stack 400 in a RAN. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by the BS and/or the UE.

While not illustrated in FIG. 4, in one example, the protocol stack 400 is split at the AN. The radio resource control (RRC) layer 405, packet data convergence protocol (PDCP) layer 410, radio link control (RLC) layer 415, medium access layer (MAC) layer 420, physical (PHY) layer 425, and radio frequency (RF) layer 430 may be implemented by the UE.

In a wireless communication network, a packet of information may flow through several sub-layers of the communication protocol stack 400 as it travels from one node to another. As shown in FIG. 4, the 5G new radio (NR) protocol stack is illustrated with the higher layers on top. An IP packet received at a lower layer may progress upward through the stack. A packet may enter the receiving protocol stack through the RLC layer 415 and travels up the protocol stack through a PDCP layer 410 and RRC layer 405. Each protocol layer may manipulate the data by adding header or subheader information, converting the data into different formats, reassembling data, and/or combining packets to form larger packets. When the transceiver station transmits the data, the data may work its way down through a protocol stack at the receiving station. The protocol at each layer may reverse the processing that was done by the corresponding layer by the receiving node; headers may be added, data may be multiplexed and divided split into smaller packets, and so on.

Once the data has progressed through the PHY, MAC, RLC, PDCP, and service data adaptation protocol (SDAP) layers, the packet may either be used or again progress downward through the protocol layers and be sent to a second receiving node. For example, where the receiving station is also a relay node, the packet may again progress downward through the protocol layers in a format supported by a link between the relay node and a destination node. Thus, when the packet reaches the PHY layer, it may again be sent to a destination node.

In some aspects, one-to-many and/or many-to-one relaying operations may be implemented to transmit multiple packets of data and/or other information to one or more targeted destination nodes, through a relay node.

Aspects Related to RLC to PDCP Handover

Figure 5:
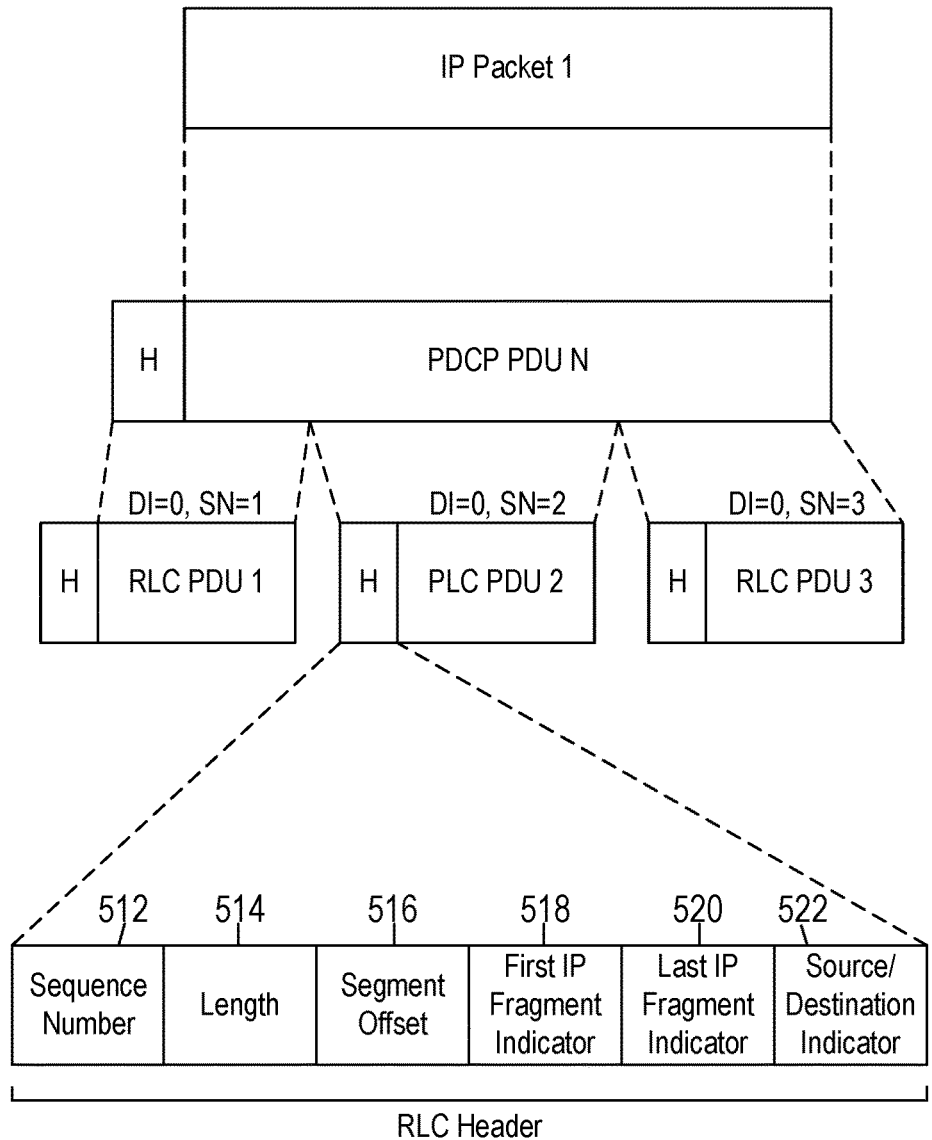
FIG. 5 depicts an example Radio Link Control (RLC) protocol data unit (PDU) header design.

FIG. 5 shows example processing 500 by packet data convergence protocol (PDCP) and radio link control (RLC) at a transmitter. A PDCP layer (e.g., the PDCP layer 410 of FIG. 4) may receive network packets, which may be referred to as PDCP service data units (SDUs). A PDCP layer may perform header compression, ciphering, and integrity protection for each packet and provide a corresponding PDCP protocol data unit (PDU). PDCP may also assign a sequentially increasing PDCP sequence number to each PDCP PDU.

An RLC layer (e.g., the RLC layer 415 of FIG. 4) may receive the PDCP PDUs, which may be referred to as RLC SDUs. In general, a PDU from a given layer/sublayer may be referred to as an SDU at the next lower layer/sublayer. RLC may perform segmentation and/or concatenation of the RLC SDUs and provide RLC PDUs of appropriate sizes for MAC. RLC may assign a sequentially increasing RLC sequence number to each RLC PDU. RLC may also re-transmit RLC PDUs received in error by a receiver. MAC may process each RLC PDU and generate a corresponding MAC PDU, which may be further process by PHY and transmitted. In the description herein, the term "packet" generically refers to a unit of data. A PDU may also be referred to as a packet.

A UE may maintain a Layer 2 configuration, which may comprise RLC and PDCP states, for a serving Node B. The RLC state may include the RLC sequence number and other information. The PDCP state may include the PDCP sequence number, information used for ciphering (e.g., cryptographic keys, ciphering algorithm, sequence number, etc.), information used for header compression (e.g., IP address, port number, timestamp, etc.), and/or other information. The RLC state information and the PDCP state information may also be referred to as RLC context and PDCP context, respectively. For each link layer state at the UE, there may be corresponding link layer state at the serving eNB. The UE may reset RLC and PDCP states at each handover to a new serving eNB. The PDCP sequence number may be incremented continuously even during handover whereas the RLC sequence number may be reset for each new serving eNB.

In the example shown in FIG. 5, IP Packet 1 is sent in one PDCP PDU with sequence number N, which is sent in three RLC PDUs with sequence numbers 1, 2 and 3. Each of the three RLC PDUs has an RLC header. In this design, the RLC header includes a field 512 for the RLC sequence number, a field 514 for the length of the RLC PDU, a field 516 for a segment offset, a field 518 for a first IP fragment indicator, a field 520 for a last IP fragment indicator, and a field 522 for a destination/source indicator. An IP packet may be segmented into multiple fragments, and each IP fragment may be sent in one RLC PDU. The segment offset indicates the start of an IP fragment sent in an RLC PDU. The first IP fragment indicator indicates whether the RLC PDU carries the first IP fragment. The last IP fragment indicator indicates whether the RLC PDU carries the last IP fragment. For uplink data transmission, field 322 carries a destination indicator (DI) that indicates an intended recipient eNB of the RLC PDU sent by the UE. For downlink data transmission, field 522 carries a source indicator (SI) that indicates the eNB originating the RLC PDU sent to the UE and having the corresponding link layer context for the UE. The RLC header may also include fewer, different and/or additional fields not shown in FIG. 5.

Aspects Related to Recovering RLC Using a RRE Procedure

A Radio Access Network (RAN) is an air interface guided by a set of protocols divided into multiple layers (e.g., Radio Link Control (RLC) layer, Packet Data Convergence Protocol (PDCP) layer, medium access control (MAC) layer). Certain 5G new radio (NR) providers configure their deployed networks to transmit segmented protocol data units (PDUs) to user equipments (UEs) at a RLC layer on a RAN. Each PDU segment is tagged with an RLC sequence number (e.g., the sequence number 512) corresponding to an RLC PDU. A receiver RLC layer (e.g., the RLC layer 415) stores the PDU segments in a reassembly window and may not forward PDUs to an upper layer (e.g. the PDCP layer 410) until all segments for a PDU are received and reassembled according to the RLC sequence number indicated in the transmission header. This also means that the UE may not forward incomplete PDUs to an upper layer of the UE until all segments for the PDU are received and reassembled.

In cases where a UE (e.g., UE 104) does not receive every PDU segment from a network entity, the RLC may delay or suspend all packet delivery to the upper layers of a UE and wait to receive all PDU segments from the network entity. The UE may monitor incoming traffic from the network at the RLC layer. If the UE does not detect a segment received in the RLC reassembly window (e.g., an inner segment or an end segment) within a particular Automatic Repeat Query (ARQ) duration timer (e.g., 40-50 milliseconds), the UE may generate an ARQ request. In response to an ARQ procedure, a network entity may retransmit missing packets to the UE.

In the current state of the art, there is no mechanism to reestablish communication between a network entity and an RLC layer of a UE when a network entity fails to respond to multiple ARQ requests during segmented PDU transmission. An ARQ request from a UE may request a status report from the network (e.g., eNB, BS) acknowledging packets (e.g., PDU packets) that have been received and negatively acknowledging the packets that have not been received. The exchange of status reports allows an RLC layer to more quickly recover missing packets. In acknowledged mode (AM) mode, a UE may request ACKs and NACKs for RLC packets using an aforementioned ARQ request.

In some cases, an ARQ status report from an ARQ request may not reach the network because of a suboptimal uplink transmission or a high block error rate (BLER). Even after repetitive ARQ attempts by a UE, a network entity may fail to transmit or retransmit certain segments, or certain segments may be transmitted but may fail to reach the UE. In this case, PDU segments may be stuck in the RLC buffer window and data flow from the RLC layer to the PDCP layer may be suspended.

Figure 6:
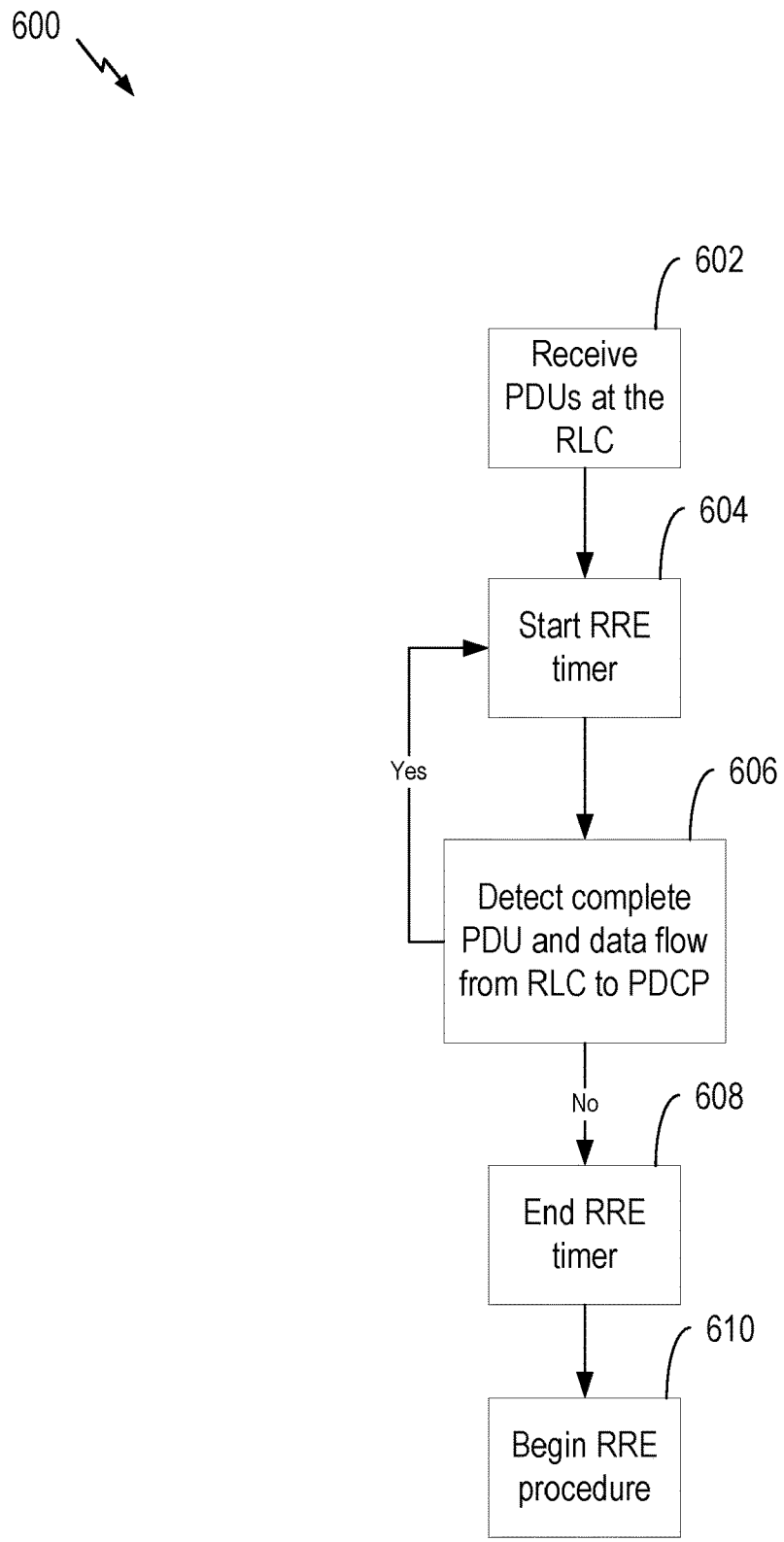
FIG. 6 is an activity diagram for a Radio Resource Control (RRC) connection reestablishment (RRE) timer at an RLC layer.

According to certain aspects of the present disclosure, a UE may reestablish RLC communication with a network entity even where ARQ requests have failed by implementing a Radio Resource Control (RRC) Connection Reestablishment (RRE) procedure. FIG. 6 illustrates a UE procedure for reestablishing wireless connection using an RRE procedure. When a UE receives PDU segments at 602, a UE may recognize the scenario where PDU segments are stuck in the reassembly window at the RLC layer by monitoring the data flow of PDUs between the RLC layer and the PDCP layer for a threshold duration measured by a continuous timer. The timer begins at 604 when the UE detects incoming PDU segments. If, at 606, the UE detects outgoing PDUs from the RLC layer to the PDCP layer, or detects the receipt of a complete PDU at the RLC layer, then the UE resets the timer. If the UE does not detect data flow from the RLC layer to the PDCP layer, the then the timer ends after a specified duration (e.g., six seconds) at 608. If the timer expires and the UE does not detect PDUs delivery to upper layers, the UE may assume that PDU segments are buffered at the reassembly window. In response to the expiry of the timer, the receiver RLC may request RRC to trigger a RRE procedure at 610. The RRE timer duration may be longer than the ARQ time duration for determining whether all PDU segments are received at the RLC, so the UE may attempt multiple ARQ requests before beginning an RRE procedure.

An RRE procedure is a mechanism that resets state variables at the RLC layer, both for the transmitting network and for the UE in an attempt to recover network connection. An RRE procedure may be triggered at an RRC layer. As a result of the RRE, RLC state variables (e.g., timers, MAC control elements, and resource blocks) are reset to initial values (i.e., 0) for both a UE and a network entity (e.g., a BS). This allows the network entity to send complete RLC PDUs and keep the data flowing normally. If the reset is not performed, the RLC window at the UE would not move forward. As a result of reset, older, failed sequence numbers are not recovered after the reset. The communication may then flow as normally, where PDUs received at the RLC layer are sent to PDCP for further processing at the PDCP.

This procedure is independent of ARQ requests, and may reestablish connection where ARQ requests are unsuccessful. By implementing aspects of the present disclosure, a UE may reduce latency and more quickly reestablish data flow from the RLC layer to the PDCP layer, even where repetitive ARQ procedures have failed.

FIG. 7 illustrates example operations 700 for wireless communication by a UE. The operations 700 may be performed, for example, by a UE (e.g., such as a UE 104 in the wireless communication network 100) to recovering RLC layer using a RRE procedure, in accordance with certain aspects of the present disclosure.

At 710, a UE may initiate a timer upon reception of a first segmented packet of a plurality of packets of an RLC PDU at RLC layer. For example, the time may begin when the UE detects receipt of PDU segments in a reassembly window. The timer may continue to run even while a UE sends multiple ARQ requests.

At 720, a UE may reset the timer when a PDCP layer receives an RLC PDU from the RLC layer. An RLC PDU may be received at a PDCP when it has been fully assembled in the RLC reassembly window. In one example, full assembly may only occur where an RLC has received all PDU segments corresponding to a sequence number.

At 730, a UE may upon expiry of the timer, initiate a RRE procedure with a network. If the UE does not detect flow from the RLC to the PDCP for the duration of the timer, the timer will expire, according to certain aspects. In one example, there may be no data flow from the RLC to the PDCP if the RLC has not received all PDU segments corresponding to a complete PDU.

Example Wireless Communication Devices

Figure 8:
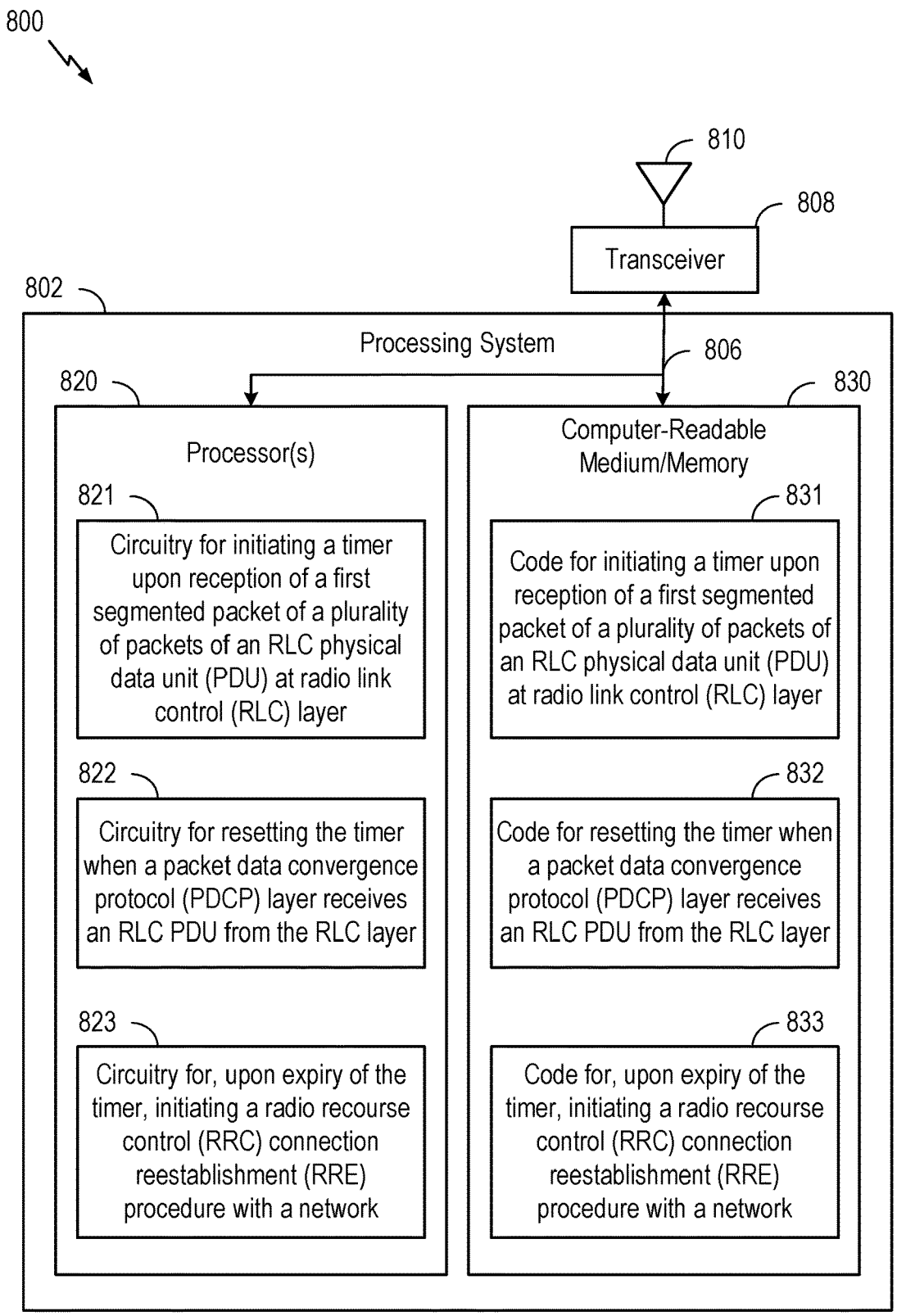
FIG. 8 depicts aspects of an example communications device.

FIG. 8 depicts an example communications device 800 that includes various components operable, configured, or adapted to perform operations for the techniques disclosed herein, such as the operations depicted and described with respect to FIG. 7. In some examples, communication device 800 may be a base station 102 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 7, or other operations for performing the various techniques discussed herein for transmitting information to an RLC layer.

In the depicted example, computer-readable medium/memory 830 stores code 831 for initiating a timer upon reception of a first segmented packet of a plurality of packets of an RLC physical data unit (PDU) at radio link control (RLC) layer, code 832 for resetting the timer when a packet data convergence protocol (PDCP) layer receives an RLC PDU from the RLC layer, and code 833 for upon expiry of the timer, initiating a radio recourse control (RRC) connection reestablishment (RRE) procedure with a network.

In the depicted example, the one or more processors 820 include circuitry configured to implement the code stored in the computer-readable medium/memory 830, including circuitry 821 for initiating a timer upon reception of a first segmented packet of a plurality of packets of an RLC PDU at RLC layer, circuitry 822 for resetting the timer when a PDCP layer receives an RLC PDU from the RLC layer, and circuitry 823 for upon expiry of the timer, initiating a radio recourse control (RRC) connection reestablishment (RRE) procedure with a network.

Various components of communications device 800 may provide means for performing the methods described herein, including with respect to FIG. 7.

In some examples, means for transmitting or sending (or means for outputting for transmission) may include the transceivers 232 and/or antenna(s) 234 of the base station 102 illustrated in FIG. 2 and/or transceiver 808 and antenna 810 of the communication device 800 in FIG. 8.

In some examples, means for receiving (or means for obtaining) may include the transceivers 232 and/or antenna (s) 234 of the base station illustrated in FIG. 2 and/or transceiver 808 and antenna 810 of the communication device 800 in FIG. 8.

In some examples, means for initiating and means for resetting may include various processing system components, such as: the one or more processors 820 in FIG. 8, or aspects of the base station 102 depicted in FIG. 2, including receive processor 238, transmit processor 220, TX MIMO processor 230, and/or controller/processor 240 (including RLC communication component 241).

Notably, FIG. 8 is an example, and many other examples and configurations of communication device 800 are possible.

Example Clauses

Implementation examples are described in the following numbered clauses:

Clause 1: A method for wireless communication by a user equipment (UE), comprising initiating a timer upon reception of a first segmented packet of a plurality of packets of an RLC physical data unit (PDU) at radio link control (RLC) layer, resetting the timer when a packet data convergence protocol (PDCP) layer receives an RLC PDU from the RLC layer, and upon expiry of the timer, initiating a radio recourse control (RRC) connection reestablishment (RRE) procedure with a network.

Clause 2: The method of clause 1, further comprising after expiry of the timer and upon reception of a second segmented packet at the RLC layer, reinitiating the timer, resetting the timer when the PDCP layer receives any RLC PDU from the RLC layer in a time duration defined by the reinitiated timer, and upon expiry of the reinitiated timer, initiating another RRC RRE procedure with the network.

Clause 3: The method of any one of clauses 1 and 2, further comprising forwarding the RLC PDU to the PDCP layer when all segments of the RLC PDU are received at the RLC layer.

Clause 4: The method of any one of clauses 1 through 3, further comprising after forwarding the RLC PDU to the PDCP layer, resetting the timer.

Clause 5: The method of any one of clauses 1 through 4, further comprising, buffering the first segmented packet in the RLC layer until all segmented packets of the plurality of packets of the RLC PDU are received at the RLC layer.

Clause 6: The method of any one of clauses 1 through 5, wherein each segmented packet for a given RLC PDU includes a same sequence number (SN), and further comprising buffering each received segmented packet at the RLC layer until all segments of having a same SN are received at the RLC layer.

Clause 7: The method of any one of clauses 1 through 6, further comprising initiating a reassembly timer upon reception of the first segmented packet of the RLC PDU at the RLC layer, during a time period defined by the reassembly timer, determining at least one segmented packet is missing from the RLC PDU, and upon expiry of the reassembly timer, transmitting an RLC automatic repeat query (ARQ) report to the network.

Clause 8: The method of clause 7, wherein a time period defined by the timer is greater than the time period defined by the reassembly timer.

Clause 9: The method of any of one clauses 1 through 8, wherein a time period defined by the timer is greater than 1 second.

Clause 10: The method of any of one clauses 1 through 9, wherein the RLC layer operates in an acknowledgment mode (AM).

Clause 11: An apparatus, comprising: a memory comprising executable instructions; one or more processors configured to execute the executable instructions and cause the apparatus to perform a method in accordance with any one of Clauses 1 through 10.

Clause 12: An apparatus, comprising means for performing a method in accordance with any one of Clauses 1 through 10.

Clause 13: A non-transitory computer-readable medium comprising executable instructions that, when executed by one or more processors of an apparatus, cause the apparatus to perform a method in accordance with any one of Clauses 1 through 10.

Clause 14: A computer program product embodied on a computer-readable storage medium comprising code for performing a method in accordance with any one of Clauses 1 through 10.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or t ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152 / AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μ.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of recovering receiver radio link control (RLC) using a radio resource control (RRC) reconnection establishment (RRE) procedure after multiple failed automatic repeat query (ARQ) attempts in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
    initiating a timer upon reception of a first segmented packet of a plurality of packets of an RLC physical data unit (PDU) at radio link control (RLC) layer;
    resetting the timer when a packet data convergence protocol (PDCP) layer receives the RLC PDU from the RLC layer; and
    upon expiry of the timer, initiating a radio recourse control (RRC) connection reestablishment (RRE) procedure with a network.

2. The method of claim 1, further comprising:
    after expiry of the timer and upon reception of a second segmented packet at the RLC layer, reinitiating the timer;
    resetting the timer when the PDCP layer receives any RLC PDU from the RLC layer in a time duration defined by the reinitiated timer; and
    upon expiry of the reinitiated timer, initiating another RRC RRE procedure with the network.

3. The method of claim 1, further comprising:
    forwarding the RLC PDU to the PDCP layer when all segments of the RLC PDU are received at the RLC layer.

4. The method of claim 3, further comprising:
    after forwarding the RLC PDU to the PDCP layer, resetting the timer.

5. The method of claim 1, further comprising:
    buffering the first segmented packet in the RLC layer until all segmented packets of the plurality of packets of the RLC PDU are received at the RLC layer.

6. The method of claim 1, wherein each segmented packet for a given RLC PDU includes a same sequence number (SN), and further comprising:
    buffering each received segmented packet at the RLC layer until all segments of having a same SN are received at the RLC layer.

7. The method of claim 1, further comprising:
    initiating a reassembly timer upon reception of the first segmented packet of the RLC PDU at the RLC layer;
    during a time period defined by the reassembly timer, determining at least one segmented packet is missing from the RLC PDU; and
    upon expiry of the reassembly timer, transmitting an RLC automatic repeat query (ARQ) report to the network.

8. The method of claim 7, wherein a time period defined by the timer is greater than the time period defined by the reassembly timer.

9. The method of claim 1, wherein a time period defined by the timer is greater than 1 second.

10. The method of claim 1, wherein the RLC layer operates in an acknowledgment mode (AM).

11. An apparatus for wireless communications, comprising:
- at least one processor; and
- a memory coupled to the at least one processor, the memory comprising code executable by the at least one processor to cause the apparatus to:
  - initiate a timer upon reception of a first segmented packet of a plurality of packets of an RLC physical data unit (PDU) at radio link control (RLC) layer;
  - reset the timer when a packet data convergence protocol (PDCP) layer receives the RLC PDU from the RLC layer; and
  - upon expiry of the timer, initiate a radio recourse control (RRC) connection reestablishment (RRE) procedure with a network.

12. The apparatus of claim 11, wherein the code executable by the at least one processor further causes the apparatus to:
- after expiry of the timer and upon reception of a second segmented packet at the RLC layer, reinitiate the timer;
- reset the timer when the PDCP layer receives any RLC PDU from the RLC layer in a time duration defined by the reinitiated timer; and
- upon expiry of the reinitiated timer, initiate another RRC RRE procedure with the network.

13. The apparatus of claim 11, wherein the code executable by the at least one processor further causes the apparatus to:
- forward the RLC PDU to the PDCP layer when all segments of the RLC PDU are received at the RLC layer.

14. The apparatus of claim 13, wherein the code executable by the at least one processor further causes the apparatus to:
- after forwarding the RLC PDU to the PDCP layer, reset the timer.

15. The apparatus of claim 11, wherein the code executable by the at least one processor further causes the apparatus to:
- buffer the first segmented packet in the RLC layer until all segmented packets of the plurality of packets of the RLC PDU are received at the RLC layer.

16. The apparatus of claim 11, wherein each segmented packet for a given RLC PDU includes a same sequence number (SN), and wherein the code executable by the at least one processor further causes the apparatus to:
- buffer each received segmented packet at the RLC layer until all segments of having a same SN are received at the RLC layer.

17. The apparatus of claim 11, wherein the code executable by the at least one processor further causes the apparatus to:
- initiate a reassembly timer upon reception of the first segmented packet of the RLC PDU at the RLC layer;
- during a time period defined by the reassembly timer, determine at least one segmented packet is missing from the RLC PDU; and
- upon expiry of the reassembly timer, transmit an RLC automatic repeat query (ARQ) report to the network.

18. The apparatus of claim 11, wherein the RLC layer operates in an acknowledgment mode (AM).

19. An apparatus for wireless communications, comprising:
- means for initiating a timer upon reception of a first segmented packet of a plurality of packets of an RLC physical data unit (PDU) at radio link control (RLC) layer;
- means for resetting the timer when a packet data convergence protocol (PDCP) layer receives the RLC PDU from the RLC layer; and
- means for, upon expiry of the timer, initiating a radio recourse control (RRC) connection reestablishment (RRE) procedure with a network.

20. The apparatus of claim 19, further comprising:
- means for, after expiry of the timer and upon reception of a second segmented packet at the RLC layer, reinitiating the timer;
- means for resetting the timer when the PDCP layer receives any RLC PDU from the RLC layer in a time duration defined by the reinitiated timer; and
- means for, upon expiry of the reinitiated timer, initiating another RRC RRE procedure with the network.

21. The apparatus of claim 19, further comprising:
- means for forwarding the RLC PDU to the PDCP layer when all segments of the RLC PDU are received at the RLC layer.

22. The apparatus of claim 21, further comprising:
- means for, after forwarding the RLC PDU to the PDCP layer, resetting the timer.

23. The apparatus of claim 19, further comprising:
- means for buffering the first segmented packet in the RLC layer until all segmented packets of the plurality of packets of the RLC PDU are received at the RLC layer.

24. The apparatus of claim 19, wherein each segmented packet for a given RLC PDU includes a same sequence number (SN), and further comprising:
- means for buffering each received segmented packet at the RLC layer until all segments of having a same SN are received at the RLC layer.

25. The apparatus of claim 19, further comprising:
- means for initiating a reassembly timer upon reception of the first segmented packet of the RLC PDU at the RLC layer;
- means for during a time period defined by the reassembly timer, determining at least one segmented packet is missing from the RLC PDU; and
- upon expiry of the reassembly timer, transmitting an RLC automatic repeat query (ARQ) report to the network.

26. The apparatus of claim 19, wherein the RLC layer operates in an acknowledgment mode (AM).

27. A computer readable medium having computer executable code stored thereon for wireless communications by a user equipment (UE), comprising:
- code for initiating a timer upon reception of a first segmented packet of a plurality of packets of an RLC physical data unit (PDU) at radio link control (RLC) layer;
- code for resetting the timer when a packet data convergence protocol (PDCP) layer receives the RLC PDU from the RLC layer; and
- code for, upon expiry of the timer, initiating a radio recourse control (RRC) connection reestablishment (RRE) procedure with a network.

28. The computer readable medium of claim 27, further comprising:
- code for, after expiry of the timer and upon reception of a second segmented packet at the RLC layer, reinitiating the timer;
- code for resetting the timer when the PDCP layer receives any RLC PDU from the RLC layer in a time duration defined by the reinitiated timer; and
- code for upon expiry of the reinitiated timer, initiating another RRC RRE procedure with the network.

29. The computer readable medium of claim 27, further comprising:
    code for forwarding the RLC PDU to the PDCP layer when all segments of the RLC PDU are received at the RLC layer.

30. The computer readable medium of claim 27, further comprising:
    code for, after forwarding the RLC PDU to the PDCP layer, resetting the timer.

\* \* \* \* \*